United States Patent

Perdomi

[11] Patent Number: 6,159,587
[45] Date of Patent: Dec. 12, 2000

[54] STRETCHABLE MULTILAYER FILMS

[75] Inventor: Gianni Perdomi, Ferrara, Italy

[73] Assignee: Montell Technology Company bv, Netherlands

[21] Appl. No.: 09/095,278

[22] Filed: Jun. 10, 1998

[30] Foreign Application Priority Data

Jun. 12, 1997 [IT] Italy .................................. MI97A1381

[51] Int. Cl.$^7$ .................................................. B32B 27/32
[52] U.S. Cl. ............................................ 428/213; 428/516
[58] Field of Search ........................... 525/246; 428/515, 428/516, 213, 215

[56] References Cited

U.S. PATENT DOCUMENTS

| | | | |
|---|---|---|---|
| 4,218,339 | 8/1980 | Zucchini et al. | 252/429 B |
| 4,472,520 | 9/1984 | Zucchini et al. | 502/104 |
| 4,521,566 | 6/1985 | Galli et al. | 525/247 |
| 4,532,189 | 7/1985 | Mueller | 428/516 |
| 4,748,221 | 5/1988 | Collomb et al. | 526/153 |
| 4,803,251 | 2/1989 | Goode et al. | 526/59 |
| 5,032,463 | 7/1991 | Smith | 428/526 |
| 5,147,709 | 9/1992 | Dohrer et al. | 428/213 |
| 5,407,732 | 4/1995 | Dokurno | 428/213 |
| 5,419,934 | 5/1995 | Wilson | 428/34.9 |
| 5,460,861 | 10/1995 | Vicik et al. | 428/34.9 |
| 5,561,195 | 10/1996 | Govoni et al. | 525/240 |
| 5,731,362 | 3/1998 | Scheve et al. | 521/142 |
| 5,747,621 | 5/1998 | Resconi et al. | 526/351 |

FOREIGN PATENT DOCUMENTS

| | | |
|---|---|---|
| 395083 A2 | 10/1990 | European Pat. Off. . |
| 400333 A2 | 12/1990 | European Pat. Off. . |
| 472946 A2 | 3/1992 | European Pat. Off. . |
| 586160 A1 | 3/1993 | European Pat. Off. . |
| 553805 A1 | 8/1993 | European Pat. Off. . |
| 553806 A1 | 8/1993 | European Pat. Off. . |
| WO 93/03078 | 2/1993 | WIPO . |
| WO 95/20009 | 7/1995 | WIPO . |

*Primary Examiner*—Paul Thibodeau
*Assistant Examiner*—D. Lawrence Tarazano
*Attorney, Agent, or Firm*—Bryan Cave LLP

[57] ABSTRACT

Stretchable multilayer films in which at least one outer layer (A) comprises a linear low density polyethylene (LLDPE), at least one intermediate layer (B) comprises a polyolefin composition containing LLDPE and a propylene polymer having an insolubility in xylene higher than 70%, and at least another layer (C) comprises a very low density polyethylene (VLDPE). bSaid films show an excellent balance between mechanical properties, represented as tear resistance and strength at break, and optical properties represented as gloss and haze.

36 Claims, No Drawings

STRETCHABLE MULTILAYER FILMS

The present invention relates to stretchable multilayer films which have improved mechanical properties. In particular, the invention relates to stretchable multilayer films comprising at least three layers: an outer layer (A) that comprises a linear low density polyethylene (LLDPE); at least an intermediate layer (B) that comprises a polyolefin composition containing LLDPE and a propylene polymer; and at least another layer (C) that comprises a very low density polyethylene (VLDPE).

The use of stretchable films in the field of wrapping and packaging goods is of significant commercial importance. The reason for this is that wrapping and packaging made of polymer films allow the goods to be assembled in stable units and in uniform shapes, thereby enabling their transportation to be rationalized and consequently made more economical. Given the large variety of types of goods to be packaged and wrapped, many different properties are required, also depending on the different packaging techniques used. Particularly important are the mechanical properties such as tear resistance. Indeed good values of tear resistance are needed to allow that materials can be packaged without tearing of the films taking place. It is moreover necessary for the films to be as economical as possible, so that their cost does not have a significant effect on the packaged product sold to the public. One of the solutions used to the purpose of reducing the costs is to pre-stretch the films before packaging. In this way, the length of the film ia increased, thereby reducing its thickness and, consequently, its cost relative to the packaged product. The extent of the pre-stretch is imposed by the possible breakage and by the fall in the mechanical performance of the film itself once it has been pre-stretched. It is therefore particularly important to make available films having high maximum pre-stretch values and, at the same time, capable of retaining good mechanical properties even after pre-stretching.

Many different polymers have been used in the past to the purpose of obtaining films capable of satisfying these requirements. Recently, the use of LLDPE has constituted an important development in this field, in view of its characteristics as to mechanical properties and processability. Nevertheless, films exclusively comprising LLDPE do not possess an entirely satisfactory combination of properties. Various solutions have therefore been proposed, including mono- or multilayer films obtained from compositions comprising LLDPE mixed with other components. U.S. Pat. No. 5,419,934 describes a stretchable multilayer film comprising two outer layers and one inner layer. The inner layer comprises a composition consisting of LLDPE in an amount ranging from 5 to 15% and a polymer selected from propylene homopolymer and copolymers, or mixtures thereof, in amounts between 85 and 95%.

The two outer layers comprise an LLDPE which has properties different from those of the LLDPE used in the inner layer, optionally mixed with other components such as EVA or LDPE. U.S. Pat. No. 5,147,709 discloses a stretch wrap multilayer film having a structure of the type ABA in which the outer layers (A) comprise an ultra low density polyethylene while the core layer (B) comprise a blend of LLDPE and high pressure LDPE in various percentages. Said film shows good properties as to noise reduction.

An improvement in the mechanical properties of the stretch films is obtained by using the polymer compositions described in international patent application WO 95/20009. This application describes polyolefin compositions of high processability, comprising: (a) from 75 to 95% by weight of a copolymer of ethylene with an α-olefin $CH_2$=CHR, where R is an alkyl radical having from 1 to 10 carbon atoms, said ethylene copolymer containing up to 20 mol % of α-olefin units; and (b) from 5 to 25% by weight of a copolymer of propylene with ethylene and with at least one α-olefin $CH_2$=CHR$'$, where R$'$ is an alkyl radical having from 2 to 10 carbon atoms. The copolymer (b) contains from 80 to 98% by weight of propylene units, from 1 to 10% by weight of ethylene units and from 1 to 10% by weight of α-olefin units and is characterized by an insolubility in xylene higher than 70%. However, these films still do not possess a satisfactory balance between mechanical and optical properties.

There is therefore a need for polymer films capable of satisfying the requirements for wide scale applicability. It has now been found, surprisingly, that stretchable multilayer films having an excellent combination of mechanical and optical properties and being therefore capable of wide-scale use are characterized by comprising at least three layers: a layer (A) that comprises LLDPE; a layer (B) that comprises a polymer composition containing LLDPE and a propylene polymer; and a layer (C) that comprises VLDPE.

The stretchable multilayer films of the present invention are characterized in that at least one outer layer (A) thereof comprises a copolymer (LLDPE) of ethylene with one or more α-olefins $CH2$=CHR$'$, where R$'$ is an alkyl radical having from 2 to 10 carbon atoms, this copolymer having a density from 0.915 to 0.945 g/cm$^3$ and a melt index from 0.01 to 100 g/10' and containing up to 20 mol % of units derived from said α-olefin $CH_2$=CHR$'$; at least one intermediate layer (B) comprises:

(i) from 80 to 100 parts by weight of a copolymer of ethylene with one or more α-olefins $CH_2$=CHR, where R is a alkyl radical having from 1 to 10 carbon atoms, this copolymer having a density from 0.88 to 0.945 g/cm$^3$, a melt index MIE of from 0.1 to 10 g/10' and containing up to 20 mol % of units derived from said α-olefin $CH_2$=CHR, and (ii) from 5 to 30 parts by weight of a copolymer of propylene with ethylene and/or one or more α-olefins $CH_2$=CHR$_f$, where R$'$ is an alkyl radical having from 2 to 10 carbon atoms, said propylene copolymer containing from 60 to 98% by weight of propylene and having an insolubility in xylene higher than 70%;

and at least another layer (C) comprises a copolymer of ethylene with one or more α-olefin $CH_2$=CHR$'$, where R$'$ is an alkyl radical having 2–10 carbon atoms, having a density between 0.87 and 0.914 g/cm$^3$.

The LLDPE which forms the layer (A) of the present invention can be any of the LLDPE known in the art. In particular, said polymer can have a density between 0.916 and 0.925 g/cm$^3$ and a melt index (MIE, determined according to ASTM method D-1238, condition E) from 0.01 to 100 g/10', preferably from 0.1 to 10 g/10', more preferably from 1 to 6 g/10'. The α-olefin is preferably selected from 1-butene, 1-hexene, 4-methyl-1-pentene, 1-octene and their mixtures; more preferably the α-olefin is octene-1. Said copolymer can be prepared by polymerization of ethylene and one or more of the above said α-olefins in the presence of Ziegler-Natta catalysts comprising the reaction product of an aluminum alkyl compound with a solid catalyst component comprising a titanium compound supported on $MgCl_2$ in active form.

The copolymer (i) used in layer (B) has preferably melt index (MIE) between 0.1 and 10 g/10', more preferably between 0.2 and 5 g/10'. The α-olefin $CH_2$=CHR may be selected, for example, from 1-butene, 1-hexene, 1-octene, 4-methyl-1-pentene and their mixtures; 1-butene and/or 1-hexene is preferably used. In the preparation of the component (i), the α-olefins $CH_2=CHR$ may also be used mixed together.

The copolymer (i) is prepared by copolymerization of ethylene with one or more α-olefins $CH_2=CHR$, in the presence of a catalyst of Ziegler-Natta type obtained by reaction of an organometallic compound of a metal from groups II and III of the Periodic Table of the Elements with a catalytic component comprising a compound of a transition metal belonging to groups IV, V or VI of the Periodic Table of the Elements. The transition metal compound is preferably supported on a solid support comprising a magnesium halide in activated form. Examples of catalysts which can be used in the preparation of the copolymer (i) are described in U.S. Pat. No. 4,218,339 and U.S. Pat. No. 4,472,520. The catalysts can also be prepared according to the methods described in U.S. Pat. No. 4,748,221 and U.S. Pat. No. 4,803,251.

Other examples of catalysts are described in European patent applications EP-A-395,083, EP-A-553,805 and EP-A-553,806.

The copolymer (i) is preferably present in amounts from 85 to 95 parts by weight and has a density preferably from 0.89 to 0.94 g/cm$^3$ more preferably between 0.90 and 0.935 g/cm$^3$.

The copolymer (ii) may be, for example, a copolymer of propylene with ethylene or a copolymer of propylene with 1-butene. Preferably, it is a terpolymer of propylene with ethylene and an α-olefin $CH_2=CHR^I$. In this case, its propylene units content is between 85 and 96% by weight, its ethylene units content is between 2 and 8% by weight and its α-olefin units content is between 2 and 7% by weight. The content of the various components is determined by IR and NMR analysis. The α-olefin $CH_2=CHR^I$ may be selected, for example, from 1-butene, 1-hexene, 1-octene and 4-methyl-1-pentene, and is preferably 1-butene or 1-hexene.

The high insolubility in xylene is indicative of a stereoregular structure of the propylene units. The insolubility in xylene, determined according to the method described below, is preferably higher than 75%, more preferably higher than 85%. The melting heat of the copolymer (ii) is generally higher than 50 J/g, preferably higher than 60 J/g, more preferably higher than 70 J/g. The melting point of the copolymer (ii) is below 140° C. and preferably between 120° C. and 140° C.

The crystalline index of the copolymer (ii) is generally higher than 50%.

The melt index (MIL, determined according to ASTM method D-1238, condition L) of the copolymer (ii) has values generally from 1 to 1000 g/10', preferably from 2 to 100 g/10', more preferably from 2 to 30 g/10'.

The copolymers according to the component (ii) can conveniently be prepared using a highly stereospecific catalyst, of the type described in patent application E-A-395,083.

The component (ii) is preferably used in amounts from 5 to 20 parts by weight.

The components (i) and (ii) of the present invention can be blended separately, before being fed into the extruder, by mixing the two components in the molten state, for example in a mixer with high mixing efficiency.

Preferably, a composition comprising components (i) and (ii) is prepared directly by polymerization working in at least two reactors in series in which, working in any order and using the same catalyst in the various reactors, copolymer (i) is synthesized in one of the reactors and copolymer (ii) is synthesized in the other. The polymerization is conveniently carried out in the gas phase using fluidized bed reactors. Examples of products prepared according to this method are described in patent applications WO 93/03078 and WO 95/20009. The layer (C) according to the definition of the present invention comprises a copolymer of ethylene with one or more α-olefins $CH_2=CHR^I$ where $R^I$ is an alkyl radical having 2 to 10 carbon atoms, having a density from 0.87 to 0.914 g/cm$^3$. More preferably the density is from 0.89 to 0.912 g/cm$^3$. The α-olefin is preferably selected from 1-butene, 1-hexene and 1-octene. Said copolymers, usually called VLDPE, contain up to 20% by weight of α-olefins and are usually obtained by copolymerization of ethylene and one or more α-olefins in the presence of Ziegler-Natta catalysts comprising the reaction product of an Al alkyl compound with a solid catalyst component comprising a Ti compound supported on a MgCl$_2$ support.

According to a particular embodiment of the invention, the layer (B) comprises not only the components (i) and (ii) but also an heterophasic polymer composition comprising:

(a) 20–100 parts by weight of a fraction which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this fraction containing more than 85% by weight of units derived from propylene; and (b) 30–80 parts by weight of a fraction which is soluble in xylene at room temperature, comprising an amorphous copolymer of ethylene with propylene and/or another α-olefin $CH_2=CHR^I$, where $R^I$ is an alkyl radical having 2–10 carbon atoms, this fraction optionally containing minor amounts of units derived from a diene and containing more than 15% by weight of units derived from ethylene.

In a preferred embodiment of the present invention, the heterophasic polyolefin composition present in layer (B) of the films according to the present invention comprises:

(a1) 10–50 parts by weight of at least one polymer selected from a propylene homopolymer having an isotactic index higher than 80, and a copolymer of propylene with at least one comonomer selected from ethylene and α-olefins of formula $CH_2=CHR^{II}$ where $R^{II}$ is an alkyl radical containing from 2 to 8 carbon atoms, said copolymer containing at least 85% by weight of units derived from propylene;

(a2) 5–20 parts by weight of a copolymer of ethylene with one comonomer selected from propylene and α-olefins of formula $CH_2=CHR^I$ where $R^I$ is an alkyl radical containing from 2 to 10 carbon atoms, this copolymer being insoluble in xylene at room temperature; and (b1) 40–80 parts by weight of a copolymer containing 10–40% by weight of units derived from ethylene, 90–60% by weight of units derived from at least one comonomer selected from propylene and α-olefins of formula $CH_2=CHR^I$ where $R^I$ is an alkyl radical containing from 2 to 10 carbon atoms and 0–5% by weight of units derived from a diene, said copolymer being soluble in xylene at room temperature and having an intrinsic viscosity from 1 and 4 dl/g;

where the total of the components (a2)+(b1) is between 50 and 90% by weight relative to the total heterophasic polyolefin composition (a1)+(a2)+(b1), and the ratio (a2)/(b1) of the amounts by weight of the components (a2) and (b1) is less than 0.4. The heterophasic polyolefin compositions used in layer (B) can conveniently be prepared by sequential polymerization in at least two stages; in a first stage a crystalline propylene homopolymer or copolymer having an isotactic index higher than 85 is prepared, in a second stage mixtures of ethylene, propylene and/or an α-olefin $CH_2=CHR^I$ are polymerized to give a predominantly amorphous copolymer.

The fraction (a) which is insoluble in xylene preferably comprises a copolymer of propylene, preferably with ethylene, this fraction containing more than 90% by weight of units derived from propylene. The amount of fraction (b) which is soluble in xylene is preferably higher than 30% of the total weight of (a)+(b), more preferably higher than 45%. The intrinsic viscosity of the fraction (b) is preferably between 1 and 4 dl/g. The α-olefin $CH_2=CHR^I$ may be, for example, 1-butene, 1-hexene, 1-octene, 4-methyl-1-pentene or a mixture thereof; it is preferably 1-butene or 1-hexene. Examples of heterophasic compositions and methods for preparing them are described in U.S. Pat. No. 4,521,566, EP-A-400,333 and EP-A-472,946. The weight ranges described for the components present in the layer (B) of the films of the present invention refer to the relative weight ratios of the components (i), (ii), (a) or (a1)+(a2), (b) or (b1). However, as explained below, further components may also be present.

The multilayer films according to the present invention are preferably prepared by the known technology of film extrusion through a flat head. In particular, in the case of the present multilayer films, three or more parallel extruders, fed with the desired polyolefin compositions, convey the molten material to a flat collecting head provided with a slot from which the superimposed molten layers emerge. The said layers are then extruded onto a rotating cylinder with a cooling facility (chill roll) which allows solidification of the extrudate with formation of the polymer film. The spin speed of the chill roll can be adjusted so as to provide films of the desired thickness.

In general, the thickness of the films ranges from 10 μm to 75 μm, preferably from 15 μm to 50 μm and more preferably from 20 μm to 35 μm.

The films obtained by the process described above may also have other layers in addition to the layers (A),(B) and (C described above. Said additional layers may be identical in composition to the layer (A),(B) or (C) or, alternatively, they may be different from either (A),(B) or (C).

The various layers (A), (B) and (C) can be present in variable amounts relative to the total weight of the film. Preferably, each of the two outer layers (A) and (C) is present in amounts generally ranging from about 5 to about 45% relative to the total weight of the film. More preferably, each outer layer is present in amounts from 10 and 30%. The two outer layers are preferably present in equal parts. According to what has been mentioned above, the films of the present invention are characterized by an excellent balance between mechanical properties, represented as tear resistance and strength at break, and optical properties represented as gloss and haze.

As demonstrated by the given examples, the stretch films of the invention show, in particular, high values of strength at break and tear resistance together with high values of gloss. In accordance with what is known by those skilled in the art or as may readily be determined by routine tests, further polymeric components, additives (such as, for example, adhesives, pigments, stabilizers, antioxidants, anti-corrosion agents, etc.) and fillers, either organic or inorganic, capable of imparting specific properties to the films of the invention may be added. Residues obtained by film trimming may also be among the various components which may be added. Said residues are generally reintroduced in the central extruder.

The following examples are given to illustrate and not to limit the invention.

EXAMPLES

The properties indicated were determined according to the following methods:

Composition of the polymers: weight percentage of the various monomers determined by I.R. or N.M.R.;

Insolubility in xylene: 2 g of polymer are dissolved in 250 cm³ of xylene at 135° C. with stirring. After 20 minutes the solution is left to cool under continued stirring until it reaches a temperature of 25° C. After 30 minutes the insoluble polymer precipitated is separated by filtration. The solvent is removed from the solution by evaporation under a stream of nitrogen and the residue is dried under vacuum at 80° C. until the weight remains constant. In this way, the percentage of polymer soluble in xylene at 25° C. is calculated and, consequently, the percentage of insoluble polymer is determined;

Melting heat: ASTM D 3418-82;

Density: ASTM D 1505;

Melt Index E (MIE): ASTM D 1238, condition E;

Melt Index L (MIL): ASTM D 1238, condition L;

Elmendorf Tear Strength: ASTM D 1922, determined both in the direction of the machine (MD) and in the transverse direction (TD);

Strength at Break: ASTM D882

Maximum pre-stretch: ASTM D4649

Haze: ASTM D 1003

Gloss: ASTM D 2457

Example 1

A stretchable multilayer film of the ABC type with a thickness of about 23 μm was prepared according to the method of coextrusion through a flat head described above, using a Dolci cast film line fitted with two Dolci 70 extruders for the outer layers and a Dolci 120 extruder for the inner layer. The composition of the film is given in Table 1. LLDPE used in layer A was an ethylene 1-octene copolymer with a MIE of 2.3 g/10' and a relative density of 0.917 g/cm³ marketed by Dow under the name Dowlex SC2100.

The composition (i)+(ii) used in layer (B) was obtained directly by polymerization in two reactors in the gas phase, as described in international patent application WO 95/20009. The composition comprises 86% by weight of an ethylene 1-butene copolymer [component (i)] and 14% by weight of a terpolymer of propylene with ethylene and 1-butene having an insolubility in xylene higher than 70% [component (ii)]. The resulting composition has a MIE of 1.9 g/10' and a relative density of 0.910 g/cm³.

The VLDPE polyethylene used in layer (C) is marketed by Polimeri Europa under the name Clearflex CLB0 and has density of 0.911 and a MIE of 3. The results of the tests to which the film was subjected are given in Table 2.

Example 2

A stretchable multilayer film of the ABC type were prepared as described in Example 1 with the only difference that a VLDPE polyethylene marketed by DOW under the name Attane 4000 having a density of 0.912 g/cm³ and a MIE of 3.1 g/10' is used in layer (C). The compositions of the films are given in Table 1, while the results of the tests to which they were subjected are given in Table 2.

Example 3

A stretchable multilayer film of the ABC type were prepared as described in Example 2 with the only difference that a composition (i)+(ii) comprising 85% by weight of an ethylene 1-butene 1-hexene copolymer [component (i)] and 15% by weight of a terpolymer of propylene with ethylene and 1-butene having an insolubility in xylene higher than 70% [component (ii)] was used in layer (B). Said composition having a final MIE of 1.9 g/10' and a final density of 0.910 g/cm³.

The compositions of the films are given in Table 1, while the results of the tests to which they were subjected are given in Table 2.

Example 4

A stretchable multilayer film of the ABC type were prepared as described in Example 1 with the only difference that layer (B) further comprised a heterophasic polymer composition which consists of about 49% of a fraction which is insoluble in xylene, containing a propylene/ethylene copolymer containing about 3% by weight of ethylene units [component (a)] and about 51% by weight of a fraction which is soluble in xylene, containing an ethylene propylene copolymer containing about 30% by weight of ethylene units [component (b)].

The compositions of the films are given in Table 1, while the results of the tests to which they were subjected are given in Table 2.

Example 5 (Comparative)

A stretchable multilayer film of the ABA type was prepared according to the method and with the apparatus described in Example 1. The LLDPE used was an ethylene 1-butene copolymer having a density of 0.918 g/cm³ and a MIE of 2.8 g/10'. The composition of the film is given in Table 1, while the results of the tests to which it was subjected are given in Table 2.

Example 6 (Comparative)

A stretchable multilayer film of the ABC type with a thickness of about 23 μm was prepared according to the method and with the apparatus used in Example 1 with the difference that an LLDPE ethylene-butene copolymer having a density of 0.918 g/cm³ and a MIE of 2.8 g/10' was used in layer (B). The composition of the film is given in Table 1, while the results of the tests to which it was subjected are given in Table 2.

Example 7 (Comparative)

A stretchable multilayer film of the BBB type with a thickness of about 23 μm was prepared according to the method and with the apparatus used in Example 1. The polymer composition (i)+(ii) of example 1 was used. The composition of the film is given in Table 1, while the results of the tests to which it was subjected are given in Table 2.

TABLE 1

Composition of the films

| % of the | EXAMPLE 1 | | | EXAMPLE 2 | | | EXAMPLE 3 | | | EXAMPLE 4 | | |
|---|---|---|---|---|---|---|---|---|---|---|---|---|
| layer in | A | B | C | A | B | C | A | B | C | A | B | C |
| total film | 15 | 70 | 15 | 15 | 70 | 15 | 15 | 70 | 15 | 15 | 70 | 15 |
| (i) + (ii) (%) | | 100 | | | 100 | | | 100 | | | 50 | |
| (a) + (b) (%) | | | | | | | | | | | 50 | |
| LLDPE (%) | 100 | | | 100 | | | 100 | | | 100 | | |
| VLDPE (%) | | | 100 | | | 100 | | | 100 | | | 100 |

| % of the | EXAMPLE 5 comparative | | | EXAMPLE 6 comparative | | | EXAMPLE 7 comparative | | |
|---|---|---|---|---|---|---|---|---|---|
| layer in | A | A | A | A | B | C | B | C | B |
| total film | 15 | 70 | 15 | 15 | 70 | 15 | 15 | 70 | 15 |
| (i) + (ii) (%) | | | | | | | 100 | 100 | 100 |
| (a) + (b) (%) | | | | | | | | | |
| LLDPE (%) | 100 | 100 | 100 | 100 | 100 | | | | |
| VLDPE (%) | | | | | | 100 | | | |

TABLE 2

| | Properties of the films | | | | | | |
|---|---|---|---|---|---|---|---|
| | EXAMPLE 1 | EXAMPLE 2 | EXAMPLE 3 | EXAMPLE 4 | EXAMPLE 5 comparative | EXAMPLE 6 comparative | EXAMPLE 7 comparative |
| Elmendorf Tear Stength | | | | | | | |
| MD (Newton) | 1.8 | 2.0 | 2.3 | 1.7 | 0.75 | 1.4 | 1.7 |
| TD (Newton) | 4.0 | 4.3 | 5.8 | 4.4 | 2.4 | 3.0 | 3.4 |
| Strength at Break | | | | | | | |
| MD (MPa) | 46.4 | 40.1 | 46 | 49.5 | 36.3 | 40.0 | 39.1 |
| TD (MPa) | 32.5 | 27.5 | 33.2 | 29.1 | 24.0 | 24.2 | 27.4 |
| Haze (%) | 0.80 | 0.68 | 0.64 | 1 | 0.56 | 0.62 | 1.30 |
| Gloss (%) | 90.5 | 91.0 | 90.9 | 90.2 | 90.3 | 89.4 | 86.1 |
| Maximum pre-stretch (%) | 310 | 320 | 320 | 310 | 200 | 300 | 300 |

What is claimed is:

1. Stretchable multilayer film characterized by comprising:
    at least an outer layer (A) that comprises a copolymer of ethylene with one or more α-olefins $CH_2=CHR^I$, where $R^I$ is an alkyl radical having from 2 to 10 carbon atoms, said copolymer having a density from 0.915 to 0.945 g/cm$^3$ and a melt index from 0.01 to 100 g/10' and containing up to 20 mol % of α-olefins $CH_2=CHR^I$;
    at least one intermediate layer (B) that comprises:
        (i) from 80 to 100 parts by weight of a copolymer of ethylene with one or more α-olefins $CH_2=CHR$, where R is an alkyl radical having from 1 to 10 carbon atoms, this copolymer having a density from 0.88 to 0.945 g/cm$^3$ and a melt index from 0.1 to 10 g/10' and containing up to 20 mol % of α-olefins $CH_2=CHR^I$;
        (ii) from 5 to 30 parts by weight of copolymer of propylene with ethylene and/or one or more α-olefins $CH_2=CHR^I$, where $R^I$ is an hydrocarbon radical having from 2 to 10 carbon atoms, said propylene copolymer containing from 60 to 98% by weight of propylene units and having an insolubility in xylene higher than 70%; and
        (iii) a heterophasic polymer composition comprising
            (a) 20–100 parts by weight of a fraction which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this fraction containing more than 85% by weight of units derived from propylene; and
            (b) 30–80 parts by weight of a fraction which is soluble in xylene at room temperature, comprising an amorphous copolymer of ethylene with propylene and/or another α-olefins $CH_2=CHR^I$, $R^I$ has the meaning said above, this fraction optionally containing minor amounts of a diene and containing more than 15% by weight of units derived from ethylene; and at least another outer layer (C) that comprises a copolymer of ethylene with one or more α-olefin $CH_2=CHR^I$, where $R^I$ is an alkyl radical having 2–10 carbon atoms, having a density between 0.87 and 0.914 g/cm$^3$.

2. Stretchable multilayer film according to claim 1, in which the ethylene α-olefins copolymer in layer (A) has a density between 0.916 and 0.925 and a melt index from 0.1 to 10 g/10'.

3. Stretchable multilayer film according to claim 2, in which the α-olefin is preferably selected from the group consisting of 1-butene, 1-hexene, 1-octene and mixtures thereof.

4. Stretchable multilayer film according to claim 1, in which the ethylene α-olefin copolymer (i) used in layer (B) has a melt index values from 0.2 to 5 g/10'.

5. Stretchable multilayer film according to claim 4, in which the α-olefin $CH_2=CHR$ is selected from the group consisting of 1-butene and 1-hexene.

6. Stretchable multilayer film according to claim 1, in which the α-olefin copolymer (i) is used in layer (B) in amounts from 85 to 95 parts by weight and has a density from 0.89 to 0.94 g/cm$^3$.

7. Stretchable multilayer film according to claim 1, in which copolymer (ii) is a copolymer of propylene with ethylene or a copolymer of propylene with 1-butene.

8. Stretchable multilayer film according to claim 1, in which copolymer (ii) is a terpolymer of propylene with ethylene and an α-olefins $CH_2=CHR^I$.

9. Stretchable multilayer film according to claim 8, in which copolymer (ii) has a propylene unit content between 85 and 96% by weight, an ethylene unit content between 2 and 8% by weight and an α-olefin unit content between 2 and 7% by weight.

10. Stretchable multilayer film according to claim 9, in which the α-olefin $CH_2=CHR^I$ is selected from the group consisting of 1-butene, 1-hexene, 1-octene, and 4-methyl-1-pentene.

11. Stretchable multilayer film according to claim 1, in which copolymer (ii) has an insolubility in a solution containing at least 75% by volume of xylene.

12. Stretchable multilayer film according to claim 1, in which copolymer (ii) has a melting heat higher than 60 J/g.

13. Stretchable multilayer film according to claim 1, in which copolymer (ii) is used in layer (B) in amounts from 5 to 20 parts by weight.

14. Stretchable multilayer film according to claim 1, in which the ethylene-α-olefin copolymer in layer (C) has a density from 0.89 to 0.912 g/cm$^3$.

15. Stretchable multilayer film according to claim 14, in which the α-olefin is selected from the group consisting of 1-butene, 1-hextene, 1-octene and mixtures thereof.

16. Stretchable multilayer film according to claim 1, having a thickness from 10 to 75 µm.

17. Stretchable multilayer film according to claim 1, in which each of the two outer layers (A) and (C) is present in the amounts generally ranging from about 5 to about 45% relative to the total weight of the stretchable multilayer film.

18. Stretchable multilayer film according to claim 17, in which the two outer layers are present in equal amounts.

19. Stretchable multilayer film characterized by comprising:
- at least an outer layer (A) that comprises a copolymer of ethylene with one or more α-olefins $CH_2=CHR^I$, where $R^I$ is an alkyl radical having from 2 to 10 carbon atoms, said copolymer having a density from 0.915 to 0.945 g/cm$^3$ and a melt index from 0.01 to 100 g/10' and containing up to 20 mol % of α-olefin $CH_2=CHR^I$;
- at least one intermediate layer (B) that comprises:
    (i) from 80 to 100 parts by weight of a copolymer of ethylene with one or more α-olefins $CH_2=CHR$, where R is an alkyl radical having from 1 to 10 carbon atoms, this copolymer having a density from 0.88 to 0.945 g/cm$^3$ and a melt index from 0.1 to 10 g/10' and containing up to 20 mol % of α-olefin $CH_2=CHR$;
    (ii) from 5 to 30 parts by weight of a copolymer of propylene with ethylene and/or one or more α-olefin $CH_2=CHR^I$, where $R^I$ is an alkyl radical having from 2 to 10 carbon atoms, said propylene copolymer containing from 60 to 98% by weight by propylene units and having an insolubility in xylene higher than 70%; and
    (iii) a heterophasic polymer composition comprising:
        (a1) 10–50 parts by weight of at least one polymer selected from a propylene homopolymer having an isotactic index of higher than 80, and a copolymer of propylene with at least one comonomer selected from ethylene and α-olefin $CH_2=CHR^{II}$ where $R^{II}$ is an alkyl radical containing from 2 to 8 carbon atoms, the said copolymer containing at least 85% by weight of units derived from propylene;
        (a2) 5–20 parts by weight of a copolymer containing ethylene and one comonomer selected from propylene and α-olefins of formula $CH_2=CHR^I$, where $R^I$ is an alkyl radical containing from 2 to 10 carbon atoms, this copolymer being insoluble in xylene at room temperature; and
        (b1) 40–80 parts by weight of a copolymer containing 10–40% by weight of units derived from ethylene, 90–60% by weight of units derived from at least one comonomer selected from propylene and α-olefins of formula $CH_2=CHR^I$, where $R^I$ is an alkyl radical containing from 2 to 10 carbon atoms and 0–5% of units derived from a diene, the said copolymer being soluble in xylene at room temperature and having an intrinsic viscosity from 1 and 4 dl/g;
        where the total of the components (a2)+(b1) is between 50 and 90% by weight relative to the heterophasic polyolefin composition (a1)+(a2)+(b1) and the ratio (a2)/(b1) of the amounts by weight of the components (a2) and (b1) is less than 0.4; and
- at least another outer layer (C) that comprises a copolymer of ethylene with one or more α-olefins $CH_2=CHR^I$, where $R^I$ is an alkyl radical having 2–10 carbon atoms, having a density between 0.87 and 0.914 g/cm$^3$.

20. Stretchable multilayer film according to claim 19, in which the ethylene α-olefin copolymer in layer (A) has a density between 0.916 and 0.925 and a melt index from .1 to 10 g/10'.

21. Stretchable multilayer film according to claim 20, in which the α-olefin is selected from the group consisting of butene-1, hexene-1, octene-1, and mixtures thereof.

22. Stretchable multilayer film according to claim 19, in which the ethylene α-olefin copolymer (i) used in layer (B) has melt index values from 0.2 to 5 g/10'.

23. Stretchable multilayer film according to claim 22, in which the α-olefin $CH_2=CHR$ is selected from the group consisting of 1-butene, 1-hexene, 1-octant, 4-methyl-1-pentene and mixtures thereof.

24. Stretchable multilayer film according to claim 19, in which the ethylene α-olefin copolymer (i) is used in layer (B) in amounts from 85 to 95 parts by weight and has a density from 0.89 to 0.94 g/cm$^3$.

25. Stretchable multilayer film according to claim 19, in which copolymer (ii) is a copolymer of propylene with ethylene or a copolymer of propylene with 1-butene.

26. Stretchable multilayer film according to claim 19, in which copolymer (ii) is a terpolymer of propylene with ethylene and an α-olefins $CH_2=CHR^I$.

27. Stretchable multilayer film according to claim 26, in which copolymer (ii) has a propylene content between 85 and 96%, by weight, an ethylene content between 2 and 8% by weight and an α-olefin $CH_2=CHR^I$ content between 2 and 7% by weight.

28. Stretchable multilayer film according to claim 27, in which the α-olefin $CH_2=CHR^I$ is selected from the group consisting of 1-butene, 1-hexene, 1-octene, 4-methyl-1-pentene, and mixtures thereof.

29. Stretchable multilayer film according to claim 19, in which copolymer (ii) has an insolubility in a solution containing at least 75% by volume of xylene.

30. Stretchable multilayer film according to claim 19, in which copolymer (ii) has a melting heat higher than 60 J/g.

31. Stretchable multilayer film according to claim 19, in which copolymer (ii) is used in layer (B) in amounts from 5 to 20 parts by weight.

32. Stretchable multilayer film according to claim 19, in which the ethylene-α-olefin copolymer in layer (C) has a density from 0.89 to 0.912 g/cm$^3$.

33. Stretchable multilayer film according to claim 32, in which the α-olefin is selected from the group consisting of 1-butene, 1-hextene, 1-octene and mixture thereof.

34. Stretchable multilayer film according to claim 19, having a thickness from 10 to 75 μm.

35. Stretchable multilayer film according to claim 19, in which each of the two outer layers (A) and (C) is present in the amounts generally ranging from about 5 to about 45% relative to the total weight of the stretchable multilayer film.

36. Stretchable multilayer film according to claim 35, in which the two outer layers are present in equal amounts.

* * * * *

UNITED STATES PATENT AND TRADEMARK OFFICE
CERTIFICATE OF CORRECTION

Page 1 of 1

PATENT NO. : 6,159,587
DATED : December 12, 2000
INVENTOR(S) : Gianni Perdomi

It is certified that error appears in the above-identified patent and that said Letters Patent is hereby corrected as shown below:

Column 12, claim 23,
Line 13, change "octant" to -- octene --

Signed and Sealed this

First Day of January, 2002

Attest:

Attesting Officer

JAMES E. ROGAN
Director of the United States Patent and Trademark Office